United States Patent
Stafford

(10) Patent No.: US 6,585,002 B2
(45) Date of Patent: *Jul. 1, 2003

(54) PRESSURE REGULATOR VALVE

(75) Inventor: Maura Jane Stafford, Conyers, GA (US)

(73) Assignee: sonnax Industries, Inc., Bellows Falls, VT (US)

(*) Notice: Subject to any disclaimer, the term of this patent is extended or adjusted under 35 U.S.C. 154(b) by 0 days.

This patent is subject to a terminal disclaimer.

(21) Appl. No.: 10/035,260

(22) Filed: Jan. 3, 2002

(65) Prior Publication Data

US 2003/0001128 A1 Jan. 2, 2003

Related U.S. Application Data

(63) Continuation-in-part of application No. 09/895,164, filed on Jun. 29, 2001.

(51) Int. Cl.[7] .................. F16K 15/00; F16K 17/00; F16K 21/04
(52) U.S. Cl. ............... 137/539; 192/3.57; 192/87.13
(58) Field of Search .............................. 137/454.2, 539; 192/3.57, 87.13, 87.18; 475/116, 119, 127; 477/158

(56) References Cited

U.S. PATENT DOCUMENTS

| 3,508,583 A | 4/1970 | Kaptur |
| 3,541,893 A | 11/1970 | Dyke et al. |
| 3,949,847 A | 4/1976 | Hoehn |
| 4,051,932 A | 10/1977 | Arai et al. |
| 4,478,105 A | 10/1984 | Yamamuro et al. |
| 4,618,036 A | 10/1986 | Ideta |
| 4,716,791 A | * 1/1988 | Ohzono et al. ............... 477/46 |
| 5,234,092 A | * 8/1993 | Mahoney ............... 192/87.13 |
| 5,251,734 A | 10/1993 | Benford et al. |
| 5,465,937 A | * 11/1995 | Nokubo et al. ........ 251/129.15 |
| 5,513,732 A | 5/1996 | Goates |
| 5,611,371 A | 3/1997 | Wirtz |
| 5,722,459 A | 3/1998 | Kim et al. |
| 5,931,179 A | * 8/1999 | Megerle et al. ........... 137/15.17 |
| 5,997,437 A | 12/1999 | Jang |

* cited by examiner

Primary Examiner—Edward K. Look
Assistant Examiner—John K Fristor Jr.
(74) Attorney, Agent, or Firm—Stephen E. Feldman

(57) ABSTRACT

The present invention relates to automatic transmissions of land motor vehicles. Specifically, the present invention relates to pressure regulation in the system of automatic transmissions of land motor vehicles. The present invention is a pressure regulator valve that limits TV pressure. This valve is meant to replace the original equipment valve in the same casing the said original valve sat. The pressure regulator valve is slightly oversized and the kit has an o-ring equipped end plug to more positively seal the valve bore and prevent pressure loss, known in the industry as EPC/TV pressure. Furthermore, the valve has annular grooves added to prevent side loading by properly centering the valve in a bore. The pressure regulator valve comprises a steel ball and a spring combination with a gel like substance being added to prevent high wear and tear of the entire valve.

9 Claims, 4 Drawing Sheets

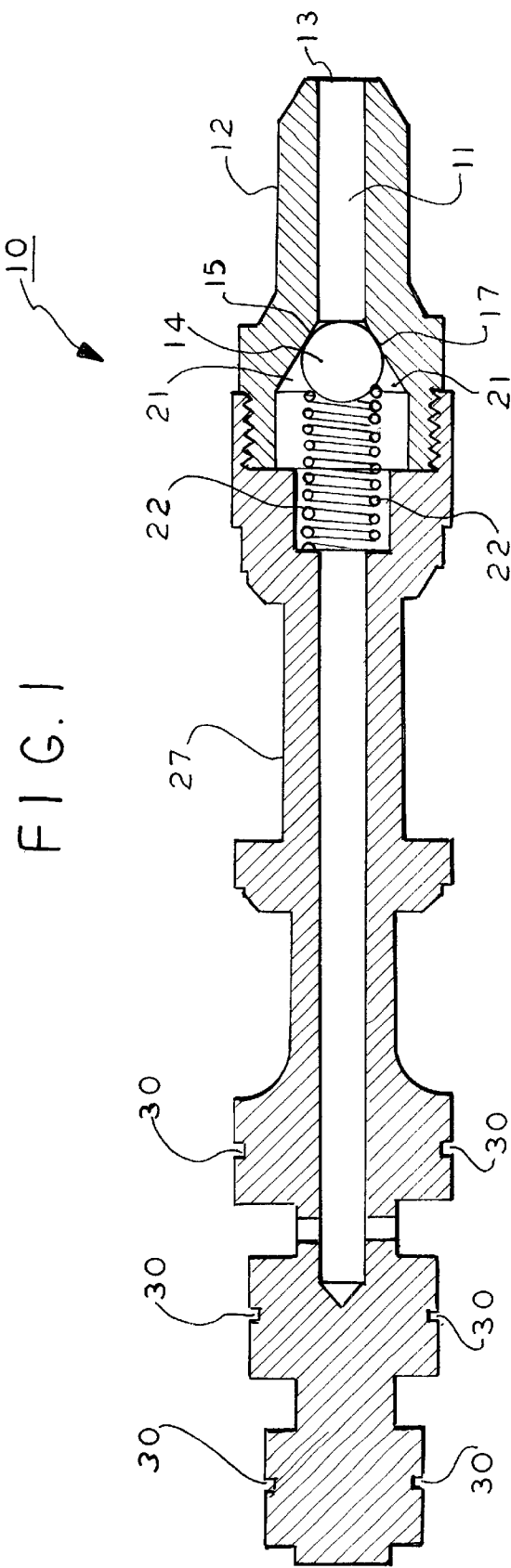

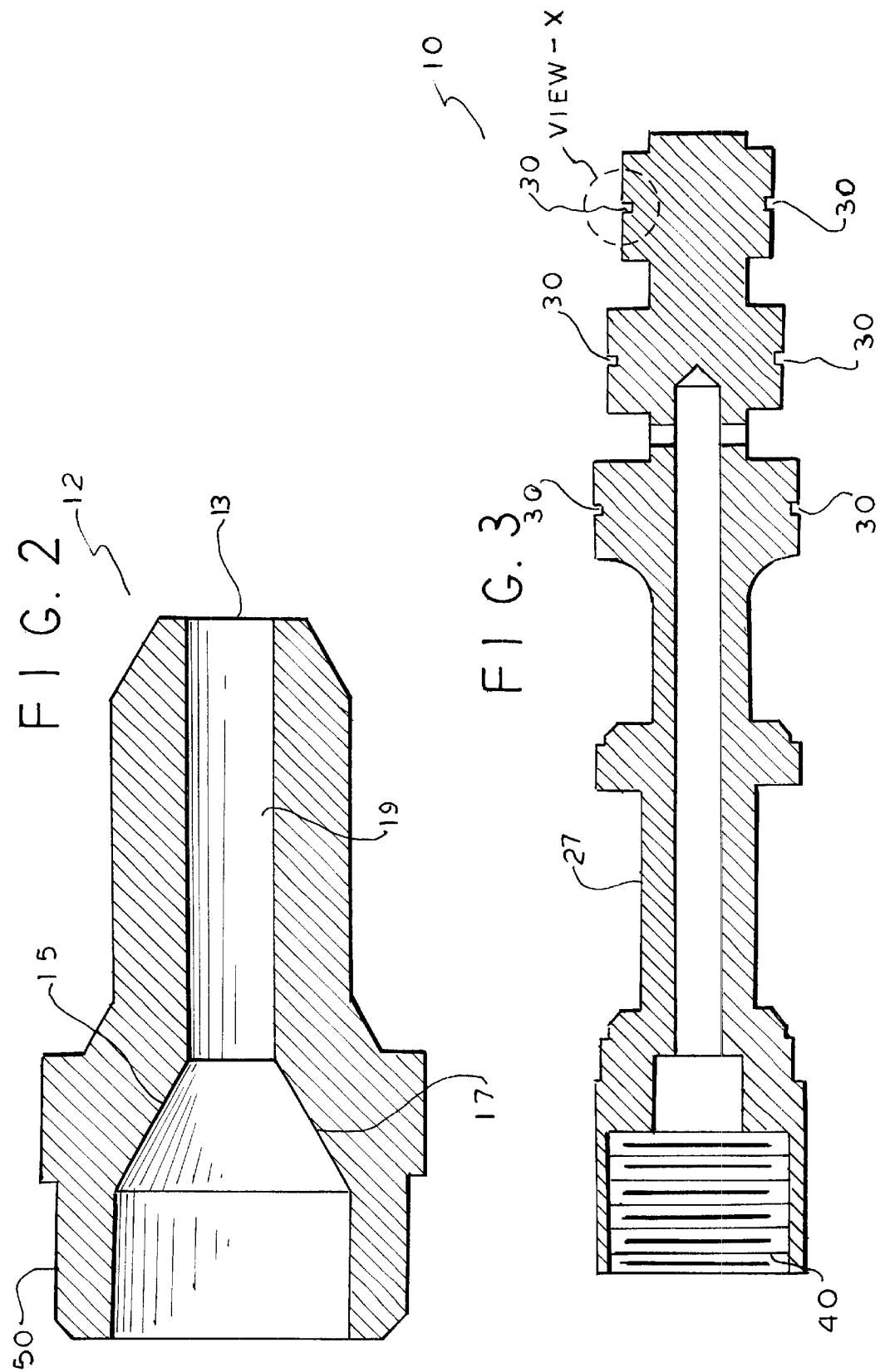

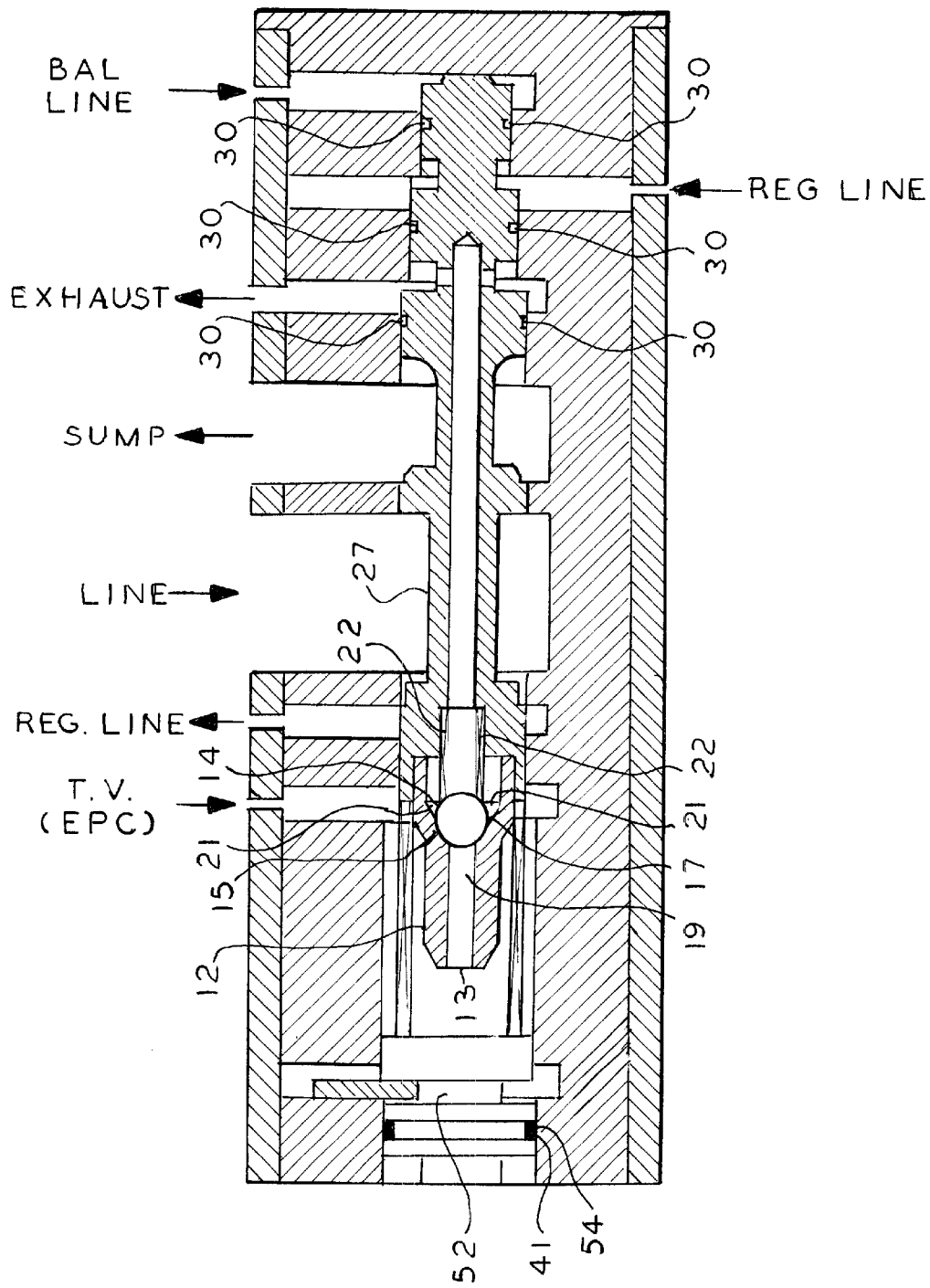

PRESSURE REGULATOR VALVE

This application is a continuation-in-part of co-pending application Ser. No. 09/895,164 filed Jun. 29, 2001.

FIELD OF INVENTION

The present invention relates to automatic transmissions of land motor vehicles. Specifically, the present invention relates to pressure regulation in the system of automatic transmissions of land motor vehicles. The present invention is a pressure regulator valve that limits TV pressure. This valve is meant to replace the original equipment valve in the same casing the said original valve sat. The pressure regulator valve is slightly oversized and the kit has an o-ring equipped end plug to more positively seal the valve bore and prevent pressure loss, known in the industry as EPC/TV pressure. Furthermore, the valve has annular grooves added to prevent side loading by properly centering the valve in a bore.

BACKGROUND OF TIRE INVENTION

There are several methods and apparatuses that are conventionally well known. The present technology presently known is described below. There are several problems that are associated with the present technology for the pressure regulator valves. The present invention solves such problems by introducing innovations making the present invention of superior quality as compared with the prior art technology. The problems associated with the prior art technology are high line pressure and harsh shifts or slide 1-2 related to slow line rise. Furthermore, there is a breakage of forward clutch drum caused by high engagement pressure.

The vehicles with a CD4E transmission often have excessively high line pressure, which can lead to broken forward drums and other parts. This high line pressure is due to unregulated EPC pressure forcing the pressure regulator valve into the maximum line position. Valve body bore wear at the pressure regulator valve contributes to the problem by allowing balance and regulated line pressure to bleed through to exhaust. The present invention provides a solution to the above stated problem. The present invention comprises a self-regulating pressure regulator valve that limits TV pressure. Annular grooves have been added to prevent side loading by properly centering the valve in the bore. The valve has been manufactured from anodized aluminum to extremely tight tolerances and is slightly oversized to restore hydraulic integrity at all spool/bore interfaces, after the bore is reamed and the valve is installed. A ball and spring have been added in order to further regulate the pressure by allowing for release of said pressure when it reaches a certain level. The spring provides enough pressure to keep the ball in place until a given pressure is reached and the ball is seated so as to prevent leakage before the given pressure is reached. An o-ringed end plug is also included to prevent EPC/TV leakage from the valve body.

There are several known prior art patents that are available in the field and their discussion follows:

U.S. Pat. No. 4,618,036 to Ideta teaches a hydraulic control system for lock-up clutch of torque converter. This particular piece of the prior art is a hydraulic control system comprising a pump driven by an engine to discharge hydraulic fluid, a torque converter having a lock-up clutch with a lock-up clutch piston movable to a clutch released position when fluid pressure within a lock-up release chamber is higher than fluid pressure within a working chamber within a torque converter cavity, a line pressure regulator valve and an orifice which provides a restricted flow communication between the torque converter and the pump even when line pressure generated by the line pressure regulator valve is lower than a predetermined value. The present invention comprises a self-regulating pressure regulator valve that limits TV pressure. Annular grooves have been added to prevent side loading by properly centering the valve in the bore. The valve has been manufactured from anodized aluminum to extremely tight tolerances and is slightly oversized to restore hydraulic integrity at all spool/bore interfaces. An o-ringed end plug is also included to prevent EPC/TV leakage from the valve body.

U.S. Pat. No. 5,611,371 to Wirtz teaches a shift/regulating valve for controlling a hydrodynamic torque converter for an automatic transmission comprising a shifting component, a valve body defining a control pressure chamber for a fluid mechanism having an end facing the shifting component, an end remote from the shifting component, and a guide bore extending from the control pressure chamber to the end remote from the shifting component. Furthermore, this prior art further comprises a spool disclosed slidably in the guide bore and having at least one control groove thereon, a control pressure outlet from the control pressure chamber, a first pressure connection to the control pressure chamber and a second pressure connection connecting at least one working chamber with at least one outlet. Moreover, the shift/regulating valve comprises a resilient element for biasing the spool toward the shifting component, wherein a second pressure connection is connected to an outlet through a control groove, a control member located in the control pressure chamber, having a first end remote from the shifting component projecting into the guide bore, and a longitudinal bore connecting the control pressure chamber to a regulating pressure chamber bounded by the spool and the control member and a pressure connection terminating in the end of the control pressure chamber remote from the shifting component. The present invention provides numerous differences and advantages over the prior art. The present invention is a self-regulating pressure regulator valve that limits TV pressure. Annular grooves have been added to prevent side loading by properly centering the valve in the bore. The valve has been manufactured from anodized aluminum to extremely tight tolerances and is slightly oversized to restore hydraulic integrity at all spool/bore interfaces. An o-ringed end plug is also included to prevent EPC/TV leakage from the valve body.

The discussed prior art presents a formidable database of information. However, this prior art does not attempt to solve the problems that the present invention is designed to answer. The present invention is a pressure regulator valve that prevents high wear and tear when used under normal operational conditions of a land motor vehicle transmission.

It should be clear to one skilled in the art, that the above discussed prior art is used for the purposes of illustration and should not be construed as limiting in any way, except for the prior art elements claimed in the above patents.

SUMMARY OF THE INVENTION

It is an object of the present invention to provide for a pressure regulator valve replacement assembly used in land motor vehicle transmissions.

Another object of the present invention is to provide for a pressure regulator valve replacement assembly used in land motor vehicle transmissions comprising a spring mechanism, a steel ball and a pressure snout.

Another object of the present invention is to provide for a pressure regulator valve replacement assembly used in land motor vehicle transmission comprising a spring mechanism, wherein said spring mechanism further comprises of a music wire.

Another object of the present invention is to provide for a pressure regulator valve replacement assembly used in land motor vehicle transmissions wherein said pressure regulator valve assembly is manufactured from aluminum.

Another object of the present invention is to provide for a pressure regulator valve replacement assembly used in land motor vehicle transmission wherein said valve assembly comprises of a gel-like material that is capable of holding parts of said valve assembly together and serving as a lubricant in said assembly.

Other objects of the present invention will become apparent from the foregoing description. It should be understood by one skilled in the art that the terms and identifications used by the applicant should not be interpreted as limiting the invention to a particular embodiment or object described above. Only the prior described above contains possible limitations to the present invention.

BRIEF DESCRIPTION OF THE DRAWINGS

The following description of preferred embodiment of the present invention will be better understood when read in conjunction with the appended drawings. It should be understood, however, that the invention is not limited to the precise arrangements shown in which:

FIG. 1 is a cross sectional view of the present invention showing the pressure regulator valve, the valve snout, the steel ball, and the spring.

FIG. 2 is a cross sectional view of the present invention showing a snout of the pressure regulator valve.

FIG. 3 is a cross sectional view of the present invention showing the pressure regulator valve.

FIG. 4 is taken from view x of FIG. 3 of the present invention showing the shape of one of the annular grooves on the pressure regulator valve.

FIG. 6 is taken from view y of FIG. 5 of the present invention showing a shape of an o-ring groove of the plug used to seal the valve body bore.

FIG. 7 is a cross sectional view of the present invention showing the pressure regulator valve, the valve snout, the steel ball, the spring, the valve body casing bore, and the o-ringed grooved plug.

DESCRIPTION OF THE PREFERRED EMBODIMENT

Figure 5:
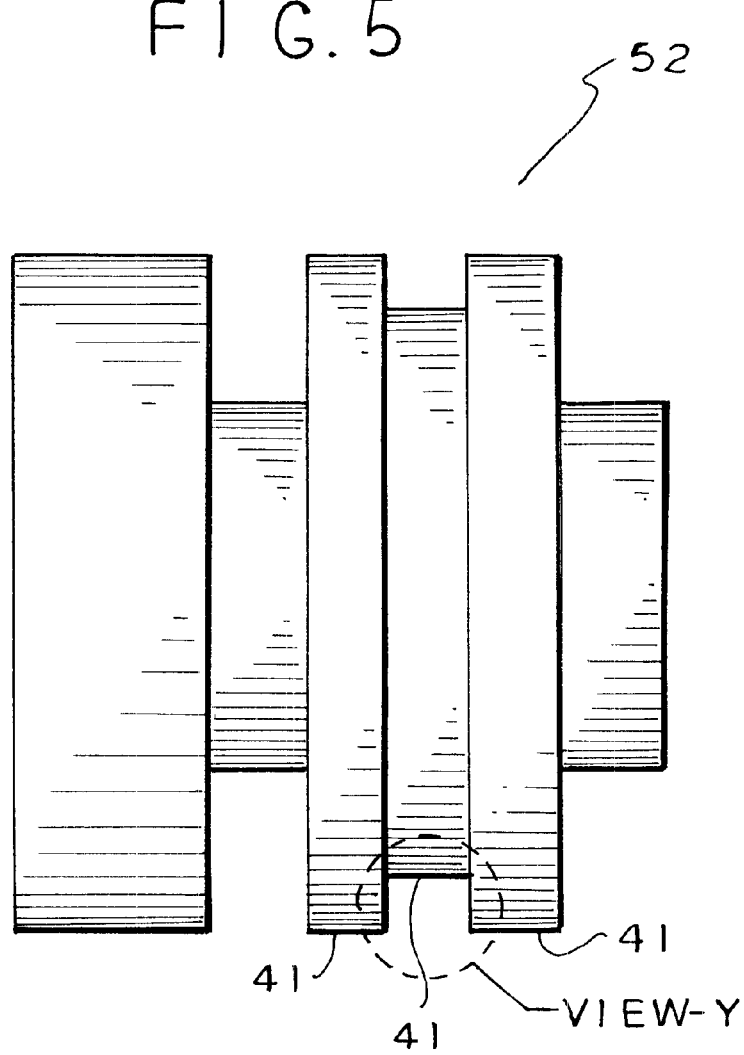
FIG. 5 is a plain view of the present invention showing the plug used to seal the valve body bore.

The present invention relates to a pressure regulator valve replacement assembly. The present invention would be better understood in conjunction with a following description of a preferred embodiment. However, it is understood by one skilled in the art that the present invention is not limited to the above referenced specific embodiment, but other embodiments are allowable, provided they are within the scope and spirit of the following claims.

In the following description, references to the drawings, certain terms are used for conciseness, clarity and comprehension. It is assumed by one skilled in the art that there are to be no unnecessary limitations implied from the such references, besides the limitations imposed by the prior art, because such terms and references are used for descriptive purposes only and intended to be broadly construed. Furthermore, the description and the drawings are for illustrative purposes only and not to be construed as limited to the exact details shown, depicted, represented, or described.

Referring to FIG. 1, the present invention is shown comprising a pressure regulator valve assembly 10. In a particular embodiment, the valve 10 may be fabricated from anodized aluminum to withstand extremely tight tolerances and is slightly oversized to restore hydraulic integrity, at all spool/bore interfaces, after the bore is reamed. The assembly 10 comprises a body 27, a snout 12, which is further shown in FIG. 2 and will subsequently be described in more detail. The assembly 10 has a ball 14 that is placed in the entrance. Furthermore, the space that is formed between the walls 15 and 17 of the snout 14 is filled with a lubricant gel like substance 21, which prevents valve assembly 10 from fast degeneration from the pressure that is being applied to it. The assembly 10 further comprises, as shown in FIG. 1, a spring 22, that compresses at an according rate to allow a certain amount of pressure to be let in. Whenever a pressure is applied to the valve assembly 10, spring 21 compresses under the pressure of the ball 14. The spring coefficient is set so that no less than 90 PSI is needed in order to compress the spring and therefore allow pressure to be released past the ball.

In one embodiment, the ball 14, as shown in FIG. 1, may be fabricated from pure steel and may have a diameter of 1.1875 inches. Furthermore, in another embodiment, the spring 22 may be a musical wire that is compressible at a specified frequency of compression of 10 cycles per second and a temperature of 300 degrees Fahrenheit. Finally, in yet another embodiment, the lubricant 21 may be any conventionally known lubricant that would perform like a gel.

Referring to FIG. 2, the snout 12 is shown. The snout 12 has walls 15 and 17 that come in contact with the ball 14. The walls 15 and 17 are machined to form sharp edges. However, upon assembly, the steel ball is seated so that part of the ball is pressed into the snout. The seating of the steel ball into the aluminum snout causes a slight impression in the walls of the snout that prevents any leakage past the ball unless the spring is compressed. The top of the snout has a channel 19 and an opening 13 that leads out of the valve assembly 10. On the opposite end of the snout, the outer casing is threaded 50 in order to properly connect with the threaded part of the valve body 40 shown in FIG. 3.

Referring to FIG. 3 and FIG. 4, the present invention is shown to have annular grooves 30. The annular grooves 30 serve to prevent side loading by properly stabilizing and centering the valve 10 in the bore. FIG. 4 shows the annular grooves from view X of FIG. 3.

Figure 8:
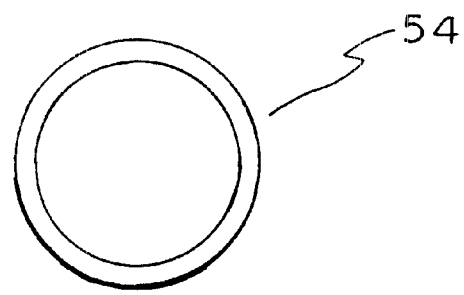
FIG. 8 is a plain view of the present invention showing the o-ring to be used in the o-ring groove on the plug.

Plug 52, as shown in FIG. 5, seals the end opening of the valve body casing bore in which the pressure regulator valve assembly 10, shown in FIG. 1, sits. The plug 52 is an addition, which serves to prevent EPC/TV pressure leakage from the bore. The plug 52 is inserted in the end of the valve body casing bore after the bore has been reamed and the new valve assembly 10 has been installed. An o-ring groove 41, as shown in FIGS. 5 and 6, is made up of walls 45 and 47 on the plug 52. These walls protrude from the center of the plug 52 and allow for the installation of an o-ring 54. This o-ring 54, as shown in FIG. 8, fits in the o-ring groove 41, and creates a more positive seal at the end of the bore. It is the combination of the plug and the o-ring that prevents EPC/TV pressure from escaping through the valve body casing bore. The plug 52 does not make contact with the valve assembly 10, but rather is inserted in the end of opening of the valve body casing bore after it is reamed and the valve 10 is installed. There are no threads to hold the plug 52 in place, rather it is forced into the bore where it is held under its own power.

In the foregoing description of the invention, reference to the drawings, certain terms, have been used for clarity, conciseness and comprehension. However, no unnecessary limitations are to be implied from or because of the terms used, beyond the requirements of the prior art, because such terms are used for descriptive purposes and are intended to be broadly construed. Furthermore, the description and illustration of the invention are by way of example, and the scope of the invention is not limited to the exact details shown, represented, or described.

While the present invention has been described with reference to specific embodiments, it is understood that the invention is not limited but rather includes any and all changes and modifications thereto which would be apparent to those skilled in the art and which come within the spirit and scope of the appended claims.

What is claimed:

1. A pressure regulator valve assembly, for a land motor vehicle transmission, which limits excessively high line pressure and is designed to fit into an existing valve body casing bore comprising:
   a. a valve body;
   b. a valve snout, attached to said valve body, further comprising an inner end and outer end;
   c. a ball, placed inside said valve body and seated to said inner end of said valve snout, which prevents pressure to leak into the valve body unless a certain maximum pressure is achieved;
   d. a spring, placed inside said valve body and attached to said valve body contacting said ball, which holds said ball in place unless pressure greater than that of its force on said ball is achieved;
   e. lubricating means for lubricating inner portions of said valve body between said ball and inner walls of said valve snout that prevents excessive wear; and,
   f. plugging means for sealing the end opening of the valve body casing bore in which the pressure regulator valve assembly resides, said plugging means utilize an o-ring for a more positive seal and prevent pressure from escaping through the valve body casing bore.

2. The pressure regulator valve assembly of claim 1, wherein said valve body may be fabricated from anodized aluminum.

3. The pressure regulator valve assembly of claim 1, wherein said ball may be fabricated from pure steel and have a diameter of 1.1875 inches.

4. The pressure regulator valve assembly of claim 1, wherein said spring may be fabricated from a musical wire.

5. The pressure regulator valve assembly of claim 1, wherein said valve assembly further comprises annular grooves, wherein said annular grooves prevent side loading of said valve assembly and properly center said valve assembly in a bore of a land motor vehicle transmission system.

6. The pressure regulator valve assembly of claim 1, wherein said plugging means utilizes an o-ring groove.

7. The pressure regulator valve assembly of claim 6, wherein said o-ring groove has side walls, wherein said side walls are extending outwardly away from said plugging means.

8. The pressure regulator valve assembly of claim 1, wherein said ball is seated so that part of the ball is pressed into said inner end of said valve snout.

9. The pressure regulator valve assembly of claim 1, wherein said spring coefficient is set so that no less than about 90 PSI is needed in order to compress said spring and therefore allow pressure to be released past said ball.

* * * * *